(12) United States Patent
Hensel et al.

(10) Patent No.: US 11,384,981 B2
(45) Date of Patent: Jul. 12, 2022

(54) APPARATUS AND METHOD FOR CONTINUOUSLY DRYING BULK GOODS

(71) Applicant: Douglas Technical Limited, Douglas (GB)

(72) Inventors: Günter Hensel, Wegberg (DE); Wolfgang Seifert, Dresden (DE)

(73) Assignee: Kronoplus Limited, Mosta (MT)

( * ) Notice: Subject to any disclaimer, the term of this patent is extended or adjusted under 35 U.S.C. 154(b) by 112 days.

(21) Appl. No.: 16/612,253

(22) PCT Filed: Jun. 6, 2017

(86) PCT No.: PCT/EP2017/063707
§ 371 (c)(1),
(2) Date: Nov. 8, 2019

(87) PCT Pub. No.: WO2018/224130
PCT Pub. Date: Dec. 13, 2018

(65) Prior Publication Data
US 2020/0064068 A1 Feb. 27, 2020

(51) Int. Cl.
*F26B 3/08* (2006.01)
*F26B 17/10* (2006.01)
*F26B 23/00* (2006.01)
*F26B 23/02* (2006.01)

(52) U.S. Cl.
CPC .......... *F26B 17/106* (2013.01); *F26B 23/002* (2013.01); *F26B 23/02* (2013.01); *F26B 2200/24* (2013.01)

(58) Field of Classification Search
CPC ...... F26B 17/106; F26B 23/002; F26B 23/02; F26B 2200/24; Y02P 70/10
USPC ............ 34/360, 359, 362, 363, 413
See application file for complete search history.

(56) References Cited

U.S. PATENT DOCUMENTS

| | | | |
|---|---|---|---|
| 653,819 A | 7/1900 | Regout | |
| 2,753,925 A | 7/1956 | Campbell | |
| 4,194,455 A | 3/1980 | Mallek | |
| 4,276,835 A | 7/1981 | Zeltner | |
| 4,878,839 A | 11/1989 | Wunning | |
| 5,034,175 A * | 7/1991 | Safstrom | B27N 3/14 264/120 |
| 5,237,757 A * | 8/1993 | Wiedmann | F26B 21/04 34/513 |
| 5,248,387 A | 9/1993 | Hansen | |
| 5,271,162 A | 12/1993 | Kunz et al. | |

(Continued)

FOREIGN PATENT DOCUMENTS

| | | |
|---|---|---|
| CA | 2 416 817 A1 | 2/2003 |
| CN | 201233166 Y | 5/2009 |

(Continued)

OTHER PUBLICATIONS

International Search Report, issued in International Application No. PCT/EP2017/063707, dated Jul. 13, 2017, pp. 1-2, European Patent Office, Rijswijk, Netherlands.

(Continued)

*Primary Examiner* — John P McCormack
(74) *Attorney, Agent, or Firm* — Crowell & Moring LLP

(57) ABSTRACT

An apparatus for drying bulk goods and a method are provided for continuously drying bulk goods. In particular, an apparatus and a method is provided for drying wood fibers.

18 Claims, 1 Drawing Sheet

(56) References Cited

U.S. PATENT DOCUMENTS

| | | | |
|---|---|---|---|
| 5,697,167 A | 12/1997 | Kunz et al. | |
| 6,820,350 B1 | 11/2004 | Eriksson et al. | |
| 6,974,494 B1* | 12/2005 | Zahedi | B03C 3/017 96/74 |
| 7,160,358 B2* | 1/2007 | Spink | B03C 9/00 96/57 |
| 8,161,661 B2* | 4/2012 | Bartol | F26B 25/007 34/86 |
| 9,200,834 B1* | 12/2015 | Ball, Jr. | F26B 21/022 |
| 10,690,409 B2 | 6/2020 | Brancuzsky et al. | |
| 2001/0015160 A1 | 8/2001 | Brunnmair et al. | |
| 2007/0251120 A1* | 11/2007 | Connell | F26B 23/02 34/576 |
| 2007/0287118 A1 | 12/2007 | Smith | |
| 2008/0271335 A1 | 11/2008 | Kimball | |
| 2009/0241814 A1 | 10/2009 | Bentzen | |
| 2011/0030235 A1* | 2/2011 | Brancuzsky | F26B 23/028 34/384 |
| 2011/0197829 A1 | 8/2011 | Suemitsu | |
| 2011/0305897 A1 | 12/2011 | Hasch et al. | |
| 2016/0209029 A1 | 7/2016 | Kobayashi et al. | |
| 2016/0304800 A1 | 10/2016 | Rautialinen | |
| 2017/0051972 A1 | 2/2017 | Brancuzsky et al. | |
| 2017/0128911 A1* | 5/2017 | Hong | B01J 20/20 |
| 2017/0350593 A1 | 12/2017 | Desellem et al. | |
| 2020/0011528 A1 | 1/2020 | Hensel et al. | |
| 2020/0011529 A1 | 1/2020 | Hensel et al. | |
| 2020/0011600 A1 | 1/2020 | Hensel et al. | |
| 2020/0011601 A1 | 1/2020 | Hensel et al. | |

FOREIGN PATENT DOCUMENTS

| | | |
|---|---|---|
| CN | 204268851 U | 4/2015 |
| EP | 0 457 203 A1 | 11/1991 |
| EP | 0 459 603 A1 | 12/1991 |
| EP | 0 714 006 A1 | 5/1996 |
| EP | 0 876 887 A2 | 11/1998 |
| EP | 0 876 887 B1 | 6/2003 |
| EP | 2 375 152 A2 | 10/2011 |
| WO | WO 03/013808 A1 | 2/2003 |
| WO | WO 03/013809 A1 | 2/2003 |
| WO | WO 2009/087108 A1 | 7/2009 |
| WO | WO 2010/094913 A2 | 8/2010 |
| WO | WO 2015/056174 A2 | 4/2015 |

OTHER PUBLICATIONS

First Office Action with English translation, issued in CN Application No. 201780091749.3, dated Apr. 27, 2020, pp. 1-53, Chinese National Intellectual Property Administration, Beijing, China.

International Search Report, issued in International Application No. PCT/EP2017/055072, dated Nov. 13, 2017, pp. 1-3, European Patent Office, Rijswijk, Netherlands.

Chinese First Office Action with English translation, issued in CN Application No. 201780087883.6, dated May 28, 2020, pp. 1-29, China Intellectual Property Administration, Beijing, China.

Canadian Office Action, dated Dec. 3, 2020, pp. 1-8, Canadian Patent Application No. 3,053,978, Canadian Intellectual Property Office, Québec, Canada.

Canadian Office Action for Canadian Patent Application No. 3,053,986, dated Apr. 16, 2021, pp. 1-3, CIPO, Gatineau, Canada.

Second Chinese Office Action with English translation for Chinese Patent application No. 201780087873.2, dated Apr. 25, 2021, pp. 1-23, Chinese Intellectual Property Office, Beijing, P.R. China.

Ukraine Office Action for Ukraine Patent Application No. 2019 09480, dated May 12, 2021, pp. 1-10, National Intellectual Property Authority, Kyiv, Ukraine.

Second Chinese Office Action with English translation for Chinese Patent application No. 201780087883.6, dated Apr. 22, 2021, pp. 1-23, Chinese Intellectual Property Office, Beijing, P.R. China.

Eurasian Office Action with English translation for Eurasian Patent application No. 201991752, dated Mar. 25, 2021, pp. 1-5, The Eurasian Patent Office, Moscow, Russia.

Notice of Allowance for U.S. Appl. No. 16/489,369 dated Apr. 12, 2021, pp. 1-13, United States Patent and Trademark Office, Alexandria, Virginia.

International Search Report, issued in International Application No. PCT/EP2017/055074, dated Nov. 13, 2017, pp. 1-3, European Patent Office, Rijswijk, Netherlands.

International Search Report, issued in International Application No. PCT/EP2017/055073, dated Nov. 13, 2017, pp. 1-3, European Patent Office, Rijswijk, Netherlands.

International Search Report, issued in International Application No. PCT/EP2017/055063, dated Nov. 13, 2017, pp. 1-2, European Patent Office, Rijswijk, Netherlands.

Non-Final Office Action for U.S. Appl. No. 16/489,819 dated Jun. 22, 2021, 18 pages.

Non-Final Office Action for U.S. Appl. No. 16/489,788 dated Jun. 22, 2021, 19 pages.

Decision of Rejection for Chinese Patent Application No. 201780087925.6 dated Jul. 28, 2021, 24 pages.

Final Office Action for U.S. Appl. No. 16/489,788 dated Feb. 15, 2022, 22 pages.

Final Office Action for U.S. Appl. No. 16/489,819 dated Feb. 1, 2022, 16 pages.

Ukrainian Office Action with English Translation for Ukraine Application No. A 2019 11120 dated Jan. 6, 2022, 12 pages.

Canadian Office Action for Canadian Patent Application No. 3,063,517, dated Oct. 5, 2021, pp. 1-4, Canadian Intellectual Property Office, Québec, Canada.

* cited by examiner

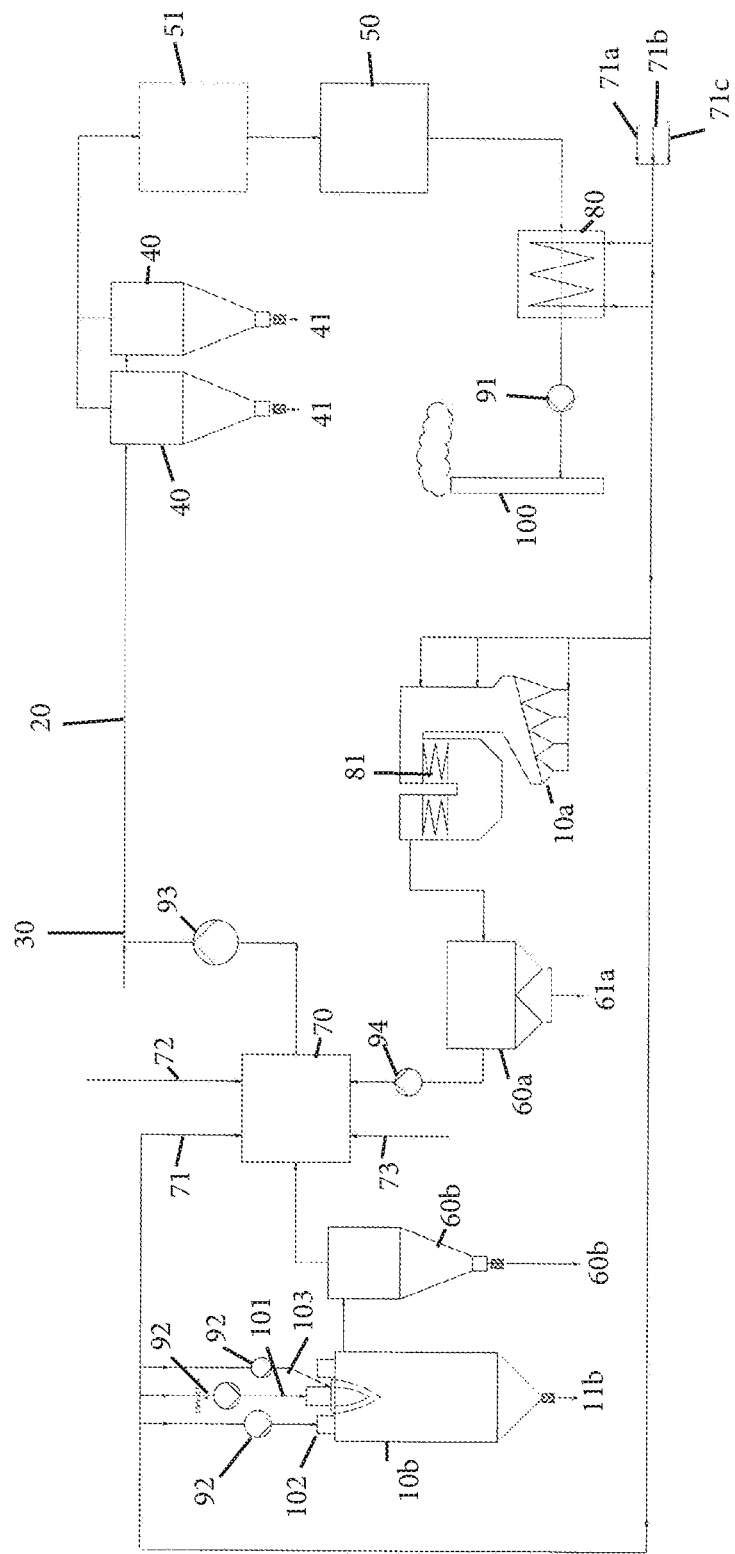

APPARATUS AND METHOD FOR CONTINUOUSLY DRYING BULK GOODS

CROSS-REFERENCE TO RELATED APPLICATIONS

This application is a 371 nationalization of international patent application PCT/EP2017/063707 filed Jun. 6, 2017. The entire contents of the above-identified application is hereby incorporated by reference.

BRIEF DESCRIPTION OF THE DRAWINGS

FIG. 1 shows an apparatus according to the present invention, in which a method according to the present invention can be implemented.

DETAILED DESCRIPTION

The present invention relates to an apparatus for drying bulk goods and a method for continuously drying bulk goods. In particular, the invention relates to an apparatus as well as a method for drying wood fibers.

From the state of the art, numerous methods for manufacture of wood-fiber-boards are known, and which wood-fibers are produced from boiled wood chips. These boiled wood chips are supplied to a so-called refiner wherein the wood chips are processed by means of grinding discs to form fibers. The fibers are removed from the refiner by means of steam and transported via a line known as "blow-line" to a drying tube. Air is blown through the drying tube at elevated temperatures in order to dry the fibers.

In a drying tube, usually the moisture content of the wood fibers is reduced from 100% to e.g. 8-11%.

In the methods known from the state of the art, the fibers can be provided with an adhesive in the blow-line before entering the drying tube, in the alternative, the dry fibers are applied with adhesive after their removal from the dryer.

Examples for the method described in the foregoing can e.g. be found disclosed in WO 03/013808 A1 or WO 03/013809 A1.

WO 2015/056174 A2 describes a process for obtaining glued fibers suitable for a production of fiberboards, wherein the fibers are carried in an air stream for the removal of high density containments from the dried fibers by means of gravity, and said dried fibers are glued.

EP 0 876 887 B1 refers to a method for the manufacture of a board from lignocellulosic material, comprising disintegration of the material, gluing, drying in two stages, forming to a mat and hot pressing the same to a ready board, where exhaust air from drying and pressing is used in a heat energy plant. The air used for drying the disintegrated lignocellulosic material is indirectly heated via heat exchangers, which are provided with thermal energy by means of a combustion furnace. The humid exhaust air, which results when drying the disintegrated lignocellulosic material is fed to the combustion furnace.

The drawback of the method described in the foregoing is, however, that the heat exchangers used to heat the drying gases with the exhaust of the combustion furnace are often subject to inspection since solids contained in the exhaust gases precipitate in the heat exchangers thus reducing the standing time of the system. Due to the fact that the wet drying gases are post-combusted in the combustion furnace, the efficiency of the combustion process is additionally reduced.

The objective of the present invention therefore is to overcome the disadvantages known from the prior art and to provide a reliable method for drying bulk material, especially wood fibers and/or wood chips.

Accordingly, the present invention relates to an apparatus for drying bulk goods, in particular of wood fibers and/or wood chips, comprising at least one hot gas generator, producing hot gases used as drying gases in at least one dryer, at least one dryer, in particular a flash tube type dryer, said at least one dryer is aligned downstream of said at least one hot gas generator and directly supplied with hot gases produced by said at least one hot gas generator, at least one blow-line entering the at least one dryer, at least one apparatus for separating the bulk goods from the drying gases which is aligned downstream of the at least one dryer, wherein downstream of the at least one apparatus for separating the bulk goods from the drying gases at least one heat exchanger is provided which uses the separated drying gases to indirectly heat at least a part of the gases being fed to the at least one hot gas generator as combustion air.

According to the present invention at least one heat exchanger, that is one heat exchanger or more than one heat exchangers, such as e.g. two, three or more heat exchangers are provided in the apparatus according to the invention. If more than one heat exchanger is provided in the apparatus according to the present invention, the heat exchangers can be provided at different positions within the apparatus and thus aligned subsequently (i.e. one heat exchanger is aligned downstream from an earlier aligned heat exchanger). In addition or in the alternative, two or more exchangers also can be operated in parallel at the same position within the apparatus according to the invention.

The hot exhaust gases produced by the at least one hot gas generator directly are used as drying gases in the apparatus according to the invention. In contrast to the methods known from the state of the art, heat exchangers which are provided directly downstream of the hot gas generator are omitted. Due to the fact that the hot gases produced by said at least one hot gas generator directly are used for drying the bulk material, not only a higher drying efficiency can be achieved, but only one drying circuit is necessary. This eliminates the need of one or more heat exchangers, which often are subject to inspection. Thus in addition a contamination of the—not existing heat exchangers—is eliminated. Accordingly, the up-time of the inventive apparatus can be increased. In addition, the at least one heat exchanger aligned downstream of the separation device is used to pre-heat gases used as combustion gases (such as e.g. primary air, secondary air and/or tertiary air) before entering the at least one hot gas generator. Accordingly, a large part of the thermal energy contained in the drying gases can be recuperated and returned to the drying system before the cooled drying gases are released into the environment. Accordingly the energetic efficiency of the whole system can be further increased.

In a preferred embodiment, at least one further heat exchanger is provided upstream and/or downstream of the above described (first) at least one heat exchanger which uses the separated drying gases to indirectly heat a thermal fluid, such as e.g. water and/or thermal oil. These fluids can be used to transport thermal energy wherever needed in the system according to the invention or to any other part of the plant.

For example, said at least one additional heat exchanger can be a heat exchanger which uses a thermal oil as heat exchange medium. This heat exchanger can be aligned downstream of the above described first heat exchangers used for preheating the combustion air for the at least one hot gas generator. Of course it is also possible to align more than one of the thermal oil heat exchangers in the series and/or in parallel.

Furthermore, it is also possible to use at least one additional heat exchanger which uses water as heat exchange medium in addition to the first type of heat exchanger (used for preheating the combustion air for the at least one hot gas generator), and—if present—in addition to the above described at least one heat exchanger working with thermal oil as heat exchange medium. In a preferred embodiment, this type of heat exchanger is the last in the row of the heat exchangers and is present, before the treated drying gases are released into the environment.

In any case it is preferred that—regardless of how many heat exchangers of the same or different type are used—the drying gases are cooled only to a temperature that contained water vapours do not condense.

Preferably, the drying gases are not cooled in a way that entrained moisture condensates.

According to a preferred embodiment, at least one cleaning device for cleaning the hot gases produced by said at least one hot gas generator is provided in between the at least one hot gas generator and the at least one dryer, so that the exhaust gases produced by said at least one hot gas generator are passed through the at least one cleaning device for cleaning the hot gases.

By means of the cleaning device, an effective removal of e.g. solids, contained within the hot gases produced by the at least one hot gas generator is possible. Accordingly, a deposition of said solid particles contained within the hot gases, e.g. fume gases, in the bulk good should be dried can effectively be suppressed. Therefore, less pollution of the bulk good is possible. Furthermore, a deposition of such solid particles in the subsequently aligned dryer is additionally suppressed. Accordingly, less maintenance of the dryer is necessary. The cleaning device provided in between the hot gas generator and a dryer therefore attributes to an enhanced service time of the apparatus of the invention. In addition, the degree of efficiency of the dryer can be maintained at high levels, a better drying efficiency of the bulk good is achieved. Thus, the apparatus according to the invention is superior to the ones known from the prior art, since overall a better efficiency results.

The specific embodiment as described in the foregoing therefore solves the problem known from the prior art, that the hot gases produced from the hot gas generator comprise high amounts of solid particles, such as soot, carbon black, etc. resulting from the combustion process in the burner. Furthermore, solid pollutants are comprised in these fume gases. Accordingly, there has been a prejudice in the prior art, that the fume gases produced by the hot gas generator cannot directly be used as drying gases for drying bulk goods, since it has been feared that the bulk goods could be polluted by the solid particles contained in the hot fume gases. Therefore, in the prior art, always heat exchangers have been aligned downstream of the hot gas generators in order to heat drying gases used for drying of the bulk goods. However, if the exhaust gases of the hot gas generator are used to indirectly heat the drying gases by means heat exchangers, it is observed that the heat exchanger negatively can be effected by deposition inside the solid heat exchangers. These depositions result from a high content of solids and be burned exhaust gases.

Accordingly, the preferred embodiment described in the foregoing contributes to the elimination of a need of a heat exchanger. Furthermore, the exhaust gases preferably can directly be used to dry the bulk goods. Accordingly, no energetic losses are observed. In addition, the cleaning of heat exchangers, once depositions have occurred can be avoided.

In an especially preferred embodiment, said at least one cleaning device for cleaning the hot gases is selected for the group consisting of a hot gas cyclone and an electrostatic precipitator, preferably a dry type electrostatic precipitator.

The at least one hot gas generator preferably is at least one solid fired hot gas generator, preferably a grate fired hot gas generator, a fluidized bed combustion hot gas generator and/or a stoker fired hot gas generator; and/or at least one multi-fuel burner.

It is also possible to combine two or more hot gas generators, which can be operated in parallel or in series.

According to another preferred embodiment the apparatus according to the invention is characterized in that said at least one hot gas generator comprises at least one solid fired hot gas generator. A solid fired hot gas generator allows the combustion of combustible organic material in any particular form, such as e.g. bulky wooden goods, particulate wooden goods or even wooden dusts. As examples for a solid fired hot gas generators grate fired hot gas generators, fluidized bed combustion hot gas generators and/or stoker fired hot gas generators are possible which also can be present in combination. However, also multi-fuel burners known from the state of the art are possible.

If more than one hot gas generator is present in the apparatus according to the invention, preferably both a solid fired hot gas generator and a multi-fuel burner are present. Accordingly, the apparatus is most flexible as far as possible fuels to cover the energetic need is concerned.

The presence of a multi-fuel burner e.g. allows the combustion of fossil fuels such as gas or light oil, or dust-like solids such as wooden dust which can occur as side product in the drying process or in a following production of chipboards. The fuels can be used alone or in combination with each other. E.g. a mixture of wood dust and light oil or a mixture of wood dust and gas can be used.

A solid fired hot gas generator according to the present invention is enabled to combust solid materials, which cannot be combusted in the multi-fuel burner systems as described in the foregoing. Therefore, an alternative energetic supply concept of the apparatus according to the present invention is possible. With the solid fired hot gas generator, all materials which cannot be used in the production of e.g. wooden particle or fiberboards, can be energetically recycled. Examples of such materials are e.g. barks, production wastes of particle boards, wooden chips, packing material and/or waste wood.

Furthermore, it is also possible to co-operate said solid fired hot gas generator in parallel or independent with a multi-fuel burner, i.e. the solid fired hot gas generator can be operated simultaneously or alternatively to the multi-fuel burner. This allows for a very flexible adjusting of the apparatus as far as the energetic supply is concerned. Also in case that the apparatus demands a peak amount of thermal energy the multi-fuel burner can help to deliver additional and quickly available thermal energy in addition to the solid fired hot gas generator.

According to another preferred embodiment the apparatus according to the invention is characterized in that at least one hot gas generator comprises at least one multi-fuel burner and at least one solid fired hot gas generator which are aligned in parallel, said at least one multi-fuel burner comprises a combustion chamber with a muffle in which a fuel/combustion air mixture is ignited and burned and a combustion chamber ceiling, said combustion chamber ceiling comprising at least one inlet for combustion air into the muffle, an outer nozzle ring forming an inlet for a cooling gas surrounding the muffle and an inner nozzle ring forming an inlet for a cooling gas inside the muffle providing a laminar flow of cooling gas along the muffle.

A special feature underlying the present invention is that at least said inner and an outer nozzle ring being separately controllable and said inner nozzle ring being fed with gas exhausted by the at least one solid fired hot gas generator, with ambient air and/or with gas resulting from external production processes, such as press exhaust gases, saw exhaust gases, sanding line exhaust gases and/or exhaust gases from a glue production line.

According to this principle, the muffle, in which the fuel/combustion air mixture is ignited, can effectively be cooled. Due to the fact, that the air, entering through the inner nozzle ring preferably comprises considerably minor oxygen content, the formation of nitrous oxides can be reduced.

This advantage enables that post-burner-treatment of the exhaust gas, in order to reduce nitrous oxide, such as e.g. the injection of urea etc. can be reduced or even omitted and leads to considerably less complex apparatuses, which are easier to operate.

In addition and in a preferred embodiment, the gases used to supply the inner nozzle ring of the multi-fuel burner as described above can also be used to be fed into the multi-fuel burner through the outer nozzle ring.

The inventive apparatus is preferably characterized in that said at least one hot gas generator is fed with combustion gases which directly are derived from external process steps such as press exhaust gases, saw exhaust gases, sanding line exhaust gases and/or exhaust gases from a glue production line. These external gases can be used as combustion air, cooling air, muffle cooling air, primary air, secondary air, tertiary air, and/or recirculation air within said at least one hot gas generator. Accordingly, the overall emission of an apparatus, which is integrated in an alignment for the production of wooden boards, can be reduced. Furthermore, reduction of emission sources is possible since these sources are thermally disposed within the at least one hot gas generator. Both a reduction of total mass flow of emissions and a reduction of total volume flow of exhaust gases therefore is possible. Especially advantageous is the increase of efficiency by the use of preheated combustion air.

In a particularly preferred embodiment of the inventive apparatus or method the cooling air supply to the hot gas generator is achieved via an interior and an exterior nozzle ring in the ceiling of the combustion chamber. It is particularly preferred, that these nozzle rings can be controlled separately from each other. Preferably, the inner nozzle ring and/or the outer nozzle ring are provided with a pre-adjusted entering angle for the respective fuel which is in the range between approximately 0, preferably 10 and approximately 60 degrees. Due to this construction of the cooling air supply respectively of the ceiling of the combustion chamber and the particular air supply in the combustion chamber as well as the guiding of the secondary air and the condensation deriving there from, combustion in the combustion chamber is achieved in a particularly advantageous manner.

According to an additionally preferred embodiment, between the at least one hot gas generator and the at least one dryer a mixing chamber is aligned which allows for the mixing of the hot gases of the at least one hot gas generator with further external gases which preferably are pre-heated and/or ambient air.

According to a further preferred embodiment according to the present invention downstream of said at least one apparatus for separating the bulk goods from drying gases at least one device for cleaning the drying gases exiting the at least one apparatus for separating the bulk goods from the drying gases is provided, said at least one device for cleaning the drying gases being preferably provided upstream of the at least one heat exchanger. These cleaning devices can e.g. be regenerative thermal oxidizers (RTO) and/or wet electrostatic precipitators (WESP).

By incorporating devices for cleaning the drying gases such as e.g. RTOs and/or WESPs, a combustion or oxidation of contained volatile organic compounds (VOC) contained in the drying gases is possible. Accordingly, the emissions produced by the apparatus according to the present invention are by far lower than comparable emissions by drying apparatus according to the state of the art. Furthermore, the cleaning devices which are located downstream of the at least one apparatus for separating the bulk goods from drying gases also can be used in order to eliminate pollutants which can be produced during the combustion process taking place in the hot gas generator.

According to this specific embodiment, the apparatus allows for a highly efficient drying of bulk goods with a minimum of harmful emissions.

Furthermore, it is advantageous if downstream of the at least one apparatus for separating the bulk goods from drying gases (40), preferably in between the at least one apparatus for separating the bulk goods from drying gases at least one solids separator for separating solids from the drying gases is provided.

Accordingly, e.g. dust particles etc. resulting from the dried bulk goods can be separated from the drying gases.

Downstream of said at least one heat exchange, at least one exhaust fan can be provided. In a particular preferred embodiment the exhaust fan directly is provided before a chimney used to exit the drying gases into the surrounding so that the complete system is operated in suction mode.

The present invention furthermore provides an arrangement for the manufacturing of wooden material boards, comprising at least one crushing device, at least one drying device and at least one pressing device. The drying device of this arrangement is configured as the apparatus described in the foregoing.

Furthermore, the present invention relates to a method for continuously drying bulk goods, in particular wood fibers and/or wood chips in at least one dryer, in particular a flash tube type dryer, which is supplied with bulk goods via a blow-line entering the at least one dryer and with hot gases produced by at least one hot gas generator, said bulk good—after exiting the at least one dryer—being separated from the drying gases by means of at least one apparatus for separating the bulk goods from the drying gases which is aligned downstream of the at least one dryer, wherein after separation of the bulk goods from the drying gases the drying gases are fed to at least one heat exchanger which uses the thermal energy of the drying gases to indirectly heat at least a part of the gases being fed to the at least one hot gas generator as combustion air.

According to the present invention, the bulk goods enter the dryer via a blow-line. Preferably, the blow-line opens into the center of the drying tube, which e.g. can have a diameter of up to 5 m, such as e.g. 2.60 m. Drying gases are blown through the drying tube at a temperature of e.g. 100-300° C., preferable 130-240° C. Accordingly, the moisture can be reduced from 100% to 8-11% moisture content in the bulk good.

The bulk goods to be dried especially can be wooden fibers which are obtained by grinding wood chips in a refiner. The fibers can be removed from the refiner by means of steam and transported to the dryer via the blow-line. The steam pressure used to transport the fibers can be approximately 10 bar, the temperature of the steam can be approximately set to 150-160° C.

The grinding process of wooden chips and the transportation of the resulting fibers via the blow-line is conventionally known from the prior art.

An adhesive can be added to the fibers in the blow-line. However, it is also possible to omit the step of adding an adhesive.

The dryer can be especially in form of a flash dryer. This type of dryer includes a long tube, which can be e.g. up to 300 m long. The fibers are transported by means of a stream of drying gases by which according to the present invention are the exhaust gases of a hot gas generator.

According to a preferred embodiment, said exhaust gases produced by at least one hot gas generator are passed through at least one cleaning device for cleaning the hot gases before entering the at least one dryer, wherein the hot gases are cleaned, wherein said at least one cleaning device for cleaning the hot gases is preferably selected for the group consisting of a hot gas cyclone and an electrostatic precipitator, preferably a dry type electrostatic precipitator.

Furthermore, it is possible that said at least one hot gas generator comprises at least one solid fired hot gas generator, preferably a grate fired hot gas generator, a fluidized bed combustion hot gas generator and/or a stoker fired hot gas generator which is fired with biomass, in particular wood biomass; and/or at least one multi-fuel burner.

In an especially preferred embodiment, the at least one multi-fuel burner comprising a combustion chamber with a muffle in which a fuel/combustion air mixture is ignited and burned and a combustion chamber ceiling, said combustion chamber ceiling comprising at least one inlet (101) which is fed with combustion air,
an outer nozzle ring (102) which is fed with a cooling gas surrounding the muffle and
an inner nozzle ring (103) which is fed with a cooling gas for providing inside the muffle a laminar flow of cooling gas along the muffle, said inner and outer nozzle ring (102) being separately controllable.

In the embodiment described in the foregoing, the inner and/or the outer nozzle ring can have an entering angle between approximately 0 and approximately 60 degrees, preferably in between 10 and 60 degrees, which angle is preferably adjustable depending on the fuel used.

Furthermore, it is possible, that between the at least one hot gas generator and the at least one dryer the hot gases of the at least one hot gas generator are mixed with further external gases which preferably are pre-heated and/or ambient air.

Especially, between the at least one apparatus for separating the bulk goods from drying gases and the at least one device for cleaning the drying gases exiting the at least one apparatus for separating the bulk goods at least one additional cleaning step for separating solids from the drying gases is carried out.

Furthermore, gases which are fed to the at least one hot gas generator as combustion air are indirectly heated by means of at least one heat exchanger which uses the thermal energy contained in the gases downstream of the at least one device for cleaning the drying gases.

Finally, the drying gases can be propelled by means of at least one exhaust fan which is provided downstream of said at least on device for cleaning the drying gases.

The present invention is further specified in the following FIGURE without restricting the invention to the specified details.

The drying apparatus according to FIG. 1 comprises a dryer 20, which in the present case is a flash tube. Wood fibers, which are to be dried within the dryer 20 are entered into the tube dryer by means of a blow-line 30. The fibers are blown into the tube dryer with superheated steam which expands into the tube 20. Hot air is blown through the dryer tube 20 which by means of fan 93. This hot air is provided from a mixing chamber 70, which is used to optionally mix hot gases resulting from hot gas generators 10*a*, 10*b* with further gases.

The apparatus as displayed in FIG. 1 comprises two hot gas generators, namely a grate fired hot gas generator 10 *a* and a multi-fuel burner 10 *b*. The exhaust gases of both types of hot gas generators flow into the mixing chamber 70. Depending on the energetically need or on fuels available, the grate fired hot gas generator 10 *a* and the multi-fuel burner 10 *b* can be operated in parallel or in the alternative. Before entering the mixing chamber 70, the hot gases produced by the grate fired hot gas generator 10 *a* and the multi-fuel burner 10 *b* are cleaned by cleaning devices. In FIG. 1, dry type electrostatic filter 60 *a* is located downstream of the grate fired hot gas generator 10 *a*, whereas a hot gas cyclone 60 *b* is located downstream of the multi-fuel burner 11 *b*. However, it is also possible that for each type of hot gas generator the same type of cleaning device is used.

The grate fired hot gas generator 10*a* optionally encompasses a thermal oil casing 81 in which the thermal energy produced by the grate fired hot gas generator 10*a* can be used for external process.

The multi-fuel burner 10*b* comprises a muffle, in which the combustion is taken place. The gases 71*a*, 71*b* and 71*c* can be used as primary air and fed into the muffle as combustion air. Inside the muffle, a combustion air/fuel mixture is ignited and combusted. The mixing of the primary air and the fuel is not displayed in FIG. 1. The primary air is added at inlet 101 into the multi-fuel burner 10*b*.

Furthermore, the multi-fuel burner 10*b* encompasses an outer nozzle ring 102, into which cooling air for the muffle can be entered.

In addition, a further muffle cooling air stream 103 can be provided directly to the muffle.

The air streams added to the multi-fuel burner 10*b* can respectively be propelled by means of adjustable fans 92.

Solids, which are extracted from the hot gases produced by either the grate fired hot gas generator 10*a* or the multi-fuel burner 10*b*, such as carbon black and/or soot can be extracted from the cleaning devices via a dust exit 61*a* or 61*b*, respectively. Also the multi-fuel burner 10*b* encompasses an exit 11*b* in which solids, which precipitate inside the multi-fuel burner 10*b* during the combustion process can be extracted.

The cleaned hot gases from the hot gas generators 10*a* and 10*b*, respectively, are entered into the mixing chamber 70. Into the mixing chamber, external gas streams such as e.g. preheated ambient air 71*a*, polluted exhaust air (such as e.g. from external processes) or exhaust air 71*c* can be entered.

Additionally, the same gases also can be entered into the mixing chamber 70 at ambient temperature at 72. Also the addition of ambient air (fresh air 73) is possible.

The hot gases produced by the hot gas generators can be conveyed by means of a fan 94 towards the mixing chamber.

By the ratio of the different air streams, the volume and/or the temperature of the gases transported to the tube dryer 20 can be adjusted.

After the drying gas/fiber mixture leaves the flash tube 20, the fibers are extracted from the gas stream by means of at least one cyclone, such as the two subsequently aligned cyclones 40 as shown in FIG. 1. The dried fibers leave the cyclones 40 at fiber exit 41.

The separated drying gases can be conducted to an optional separation device 51, in which solid particles can be extracted from the gas stream. Further, downstream the gases are treated in an emission control system, i.e. a cleaning device 50. This cleaning device can be e.g. a regenerative thermal oxidizer (RTO) or a wet electrostatic precipitator (WSEP). It is possible that either one or both of the aforementioned devices are present.

The thus cleaned drying gases are then further conveyed to a heat exchanger 80 in which the entrained thermal energy of the drying gases is recuperated. Preferably, the drying gases are not cooled in a way that entrained moisture condensates. The recuperated energy is transferred to a part of the gases 71a, 71b and 71c which are fed to the hot gas generators 10a and 10b as combustion air.

In alternative and also preferred embodiments, an additional second heat exchanger which uses a thermal oil as heat exchange medium (not shown) can be aligned downstream of the heat exchanger 80.

Additionally, a third heat exchanger which uses a water as heat exchange medium (not shown) can be aligned downstream of the second heat exchanger.

The gases are propelled by means of a fan 91 towards a chimney 100, wherein the cleaned gases are released into the environment. The second and third heat exchangers (if present) preferably are aligned upstream of fan 91 so that all heat exchangers can be operated in suction mode.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

The subject-matter of the disclosure may also relate, among others, to the following aspects:

A first aspect relates to a method for continuously drying bulk goods, in particular wood fibers and/or wood chips in at least one dryer (20), in particular a flash tube type dryer, which is supplied with bulk goods via a blow-line (30) entering the at least one dryer (20) and with hot gases produced by at least one hot gas generator (10a, 10b), said bulk good—after exiting the at least one dryer (20)—being separated from the drying gases by means of at least one apparatus for separating the bulk goods from the drying gases (40) which is aligned downstream of the at least one dryer (20), characterized in that after separation of the bulk goods from the drying gases the drying gases are fed to at least one heat exchanger (80) which uses the thermal energy of the drying gases to indirectly heat at least a part of the gases being fed to the at least one hot gas generator (10a, 10b) as combustion air.

A second aspect relates to the method of any preceding aspect, wherein in between the at least one apparatus for separating the bulk goods from drying gases (40) and the at least one device for cleaning the drying gases exiting the at least one apparatus for separating the bulk goods at least one additional cleaning step for separating solids from the drying gases is carried out.

A third aspect relates to the method of any preceding aspect, wherein after separation of the bulk goods from the drying gases the drying gases are cleaned by means of at least one device for cleaning the drying gases (50), which preferably is provided upstream of the at least one heat exchanger (80).

A fourth aspect relates to the method of any preceding aspect, wherein the drying gases are cleaned by means of at least one regenerative thermal oxidizer (RTO) and/or at least one wet electrostatic precipitator (WESP).

A fifth aspect relates to the method of any preceding aspect, wherein downstream of the at least one apparatus for separating the bulk goods from drying gases (40), preferably in between the at least one apparatus for separating the bulk goods from drying gases (40) and the at least one device for cleaning the drying gases (50) solids are removed from the drying gases by means of at least one solids separator (51).

A sixth aspect relates to the method of any preceding aspect, wherein the drying gases are propelled by means of at least one exhaust fan (91) which is provided downstream of said at least one heat exchanger (80).

In addition to the features mentioned in each of the independent aspects enumerated above, some examples may show, alone or in combination, the optional features mentioned in the dependent aspects and/or as disclosed in the description above and shown in the figures.

The invention claimed is:

1. An apparatus for drying bulk goods comprising:
 at least one hot gas generator for production of hot gases used as drying gases in at least one dryer;
 said at least one dryer is aligned downstream of said at least one hot gas generator and directly supplied with the hot gases produced by said at least one hot gas generator;
 at least one blow-line configured to enter the at least one dryer;
 at least one apparatus for separating the bulk goods from the drying gases which is aligned downstream of the at least one dryer;
 downstream of the at least one apparatus for separating the bulk goods from the drying gases, at least one heat exchanger configured to use the separated drying gases to indirectly heat at least a part of gases fed to the at least one hot gas generator as combustion air;
 at least one device for cleaning the drying gases that exit the at least one apparatus for separating the bulk goods from the drying gases, said at least one device provided downstream of said at least one apparatus for separating the bulk goods from drying gases and upstream of the at least one heat exchanger, said at least one device for cleaning the drying gases being configured to combust or oxidize volatile organic compounds (VOC) contained in the drying gases and/or being configured to eliminate pollutants which can be produced during the combustion process taking place in the at least one hot gas generator; and at least one solids separator for separating solids containing dust particles resulting from the dried bulk goods from the drying gases, said at least one solids separator provided downstream of the at least one apparatus for separating the bulk goods from drying gases and in between the at least one apparatus for separating the bulk goods from drying gases and the at least one device for cleaning the drying gases.

2. The apparatus according to claim 1, wherein upstream and/or downstream of the least one heat exchanger, at least one further heat exchanger is configured to use the separated drying gases to indirectly heat a thermal fluid.

3. The apparatus according to claim 1, wherein at least one cleaning device for cleaning the hot gases produced by said at least one hot gas generator is in between the at least one hot gas generator and the at least one dryer, so that the exhaust gases produced by said at least one hot gas generator are passed through the at least one cleaning device for cleaning the hot gases.

4. The apparatus according to claim 3, wherein said at least one cleaning device for cleaning the hot gases is selected from the group consisting of a hot gas cyclone and an electrostatic precipitator.

5. The apparatus according to claim 1, wherein said at least one hot gas generator comprises at least one solid fired hot gas generator, a grate fired hot gas generator, a fluidized bed combustion hot gas generator, and/or a stoker fired hot gas generator; and/or at least one multi-fuel burner.

6. The apparatus according to claim 5, wherein said at least one hot gas generator comprises at least one solid fired hot gas generator and at least one multi-fuel burner, which are configured to be operated in parallel.

7. The apparatus according to claim 6, wherein the at least one multi-fuel burner comprises:
a combustion chamber with a muffle in which a fuel/combustion air mixture is ignited and burned; and
a combustion chamber ceiling, wherein said combustion chamber ceiling comprises
at least one inlet for combustion air into the muffle,
an outer nozzle ring configured to form an inlet for a cooling gas surrounding the muffle, and
an inner nozzle ring configured to form an inlet for a cooling gas inside the muffle and provide a laminar flow of cooling gas along the muffle,
wherein said inner nozzle ring and outer nozzle ring are separately controllable.

8. The apparatus according to the claim 7, wherein the inner nozzle ring and/or the outer nozzle ring comprises an entering angle of approximately 0 degrees to approximately 60 degrees.

9. The apparatus according to claim 1, wherein between the at least one hot gas generator and the at least one dryer, a mixing chamber is aligned which allows for the mixing of the hot gases of the at least one hot gas generator with further external gases and/or ambient air.

10. The apparatus according to the claim 1, wherein the at least one device for cleaning the drying gases is selected from the group consisting of regenerative thermal oxidizers (RTO) and wet electrostatic precipitators (WESP).

11. The apparatus according to claim 1, wherein at least one exhaust fan is downstream of said at least one heat exchanger.

12. The apparatus according to claim 1, wherein the bulk goods include wood fibers and/or wood chips.

13. A method for continuously drying bulk goods in at least one dryer, the method comprising:
supplying the at least one dryer with bulk goods via a blow-line entering the at least one dryer and with hot gases produced by at least one hot gas generator;
separating said bulk goods after exiting the at least one dryer from the drying gases by at least one apparatus for separating the bulk goods from the drying gases which is aligned downstream of the at least one dryer;
feeding the drying gasses, after separation of the bulk goods from the drying gases, to at least one heat exchanger which uses the thermal energy of the drying gases to indirectly heat at least a part of gases being fed to the at least one hot gas generator as combustion air;
after separating said bulk goods from the drying gases, cleaning the drying gases by at least one device, which is provided upstream of the at least one heat exchanger, wherein the at least one device for cleaning the drying gases combusts or oxidizes volatile organic compounds (VOC) contained in the drying gases and/or eliminates pollutants which can be produced during the combustion process taking place in the at least one hot gas generator; and
removing solids containing dust particles resulting from the dried bulk goods from the drying gases by at least one solids separator, wherein the at least one solids separator is provided downstream of the at least one apparatus for separating the bulk goods from drying gases and in between the at least one apparatus for separating the bulk goods from drying gases and the at least one device for cleaning the drying gases.

14. The method according to claim 13, wherein exhaust gases produced by at least one hot gas generator are passed through at least one cleaning device for cleaning the hot gases before entering the at least one dryer, wherein the hot gases are cleaned.

15. The method according to claim 13, wherein said at least one hot gas generator comprises
at least one solid fired hot gas generator and/or at least one multi-fuel burner.

16. The method according to claim 15, wherein the at least one multi-fuel burner comprises
a combustion chamber with a muffle in which a fuel/combustion air mixture is ignited and burned, and
a combustion chamber ceiling,
wherein said combustion chamber ceiling comprises
at least one inlet, which is fed with combustion air,
an outer nozzle ring which is fed with a cooling gas surrounding the muffle, and
an inner nozzle ring which is fed with a cooling gas for providing inside the muffle a laminar flow of cooling gas along the muffle,
wherein said inner and outer nozzle ring are separately controllable.

17. The method according to claim 16, wherein the inner nozzle ring and/or the outer nozzle ring has/have an entering angle between approximately 0 and approximately 60 degrees.

18. The method according to claim 13, wherein between the at least one hot gas generator and the at least one dryer, the hot gases of the at least one hot gas generator are mixed with further external gases and/or ambient air.

* * * * *